United States Patent [19]

Lovichi et al.

[11] 4,256,502

[45] Mar. 17, 1981

[54] METHOD OF PREPARING CEMENT CLINKER FROM CARBONIFEROUS SHALE

[75] Inventors: Jean-Pierre Lovichi; Bernard LeBras; Robert Guyot; Francois Guilmin, all of Montelimar, France

[73] Assignee: Lafarge Conseils et Etudes, Paris, France

[21] Appl. No.: 47,740

[22] Filed: Jun. 12, 1979

[30] Foreign Application Priority Data

Jun. 12, 1978 [FR] France ................................ 78 17527

[51] Int. Cl.³ .............................................. C04B 7/44
[52] U.S. Cl. .................................................... 106/100
[58] Field of Search ................................ 106/100, 103

[56] References Cited

U.S. PATENT DOCUMENTS

| 3,973,980 | 8/1976 | Rohrbach et al. | 106/100 |
| 4,045,162 | 8/1977 | Christiansen | 106/100 |

Primary Examiner—James Poer
Attorney, Agent, or Firm—Bernard A. Reiter

[57] ABSTRACT

The invention is related to a method and an installation for preparing cement clinker from carboniferous shale or from any other mineral substance capable of releasing a certain amount of calorific power. According to this novel method, raw material constituted in part by previously calcined carboniferous shale and in part by additive substances which may contain limestone and clay, is submitted to clinkerization. The additive substances are at least partially decarbonated prior to their admixture with the shale.

4 Claims, 1 Drawing Figure

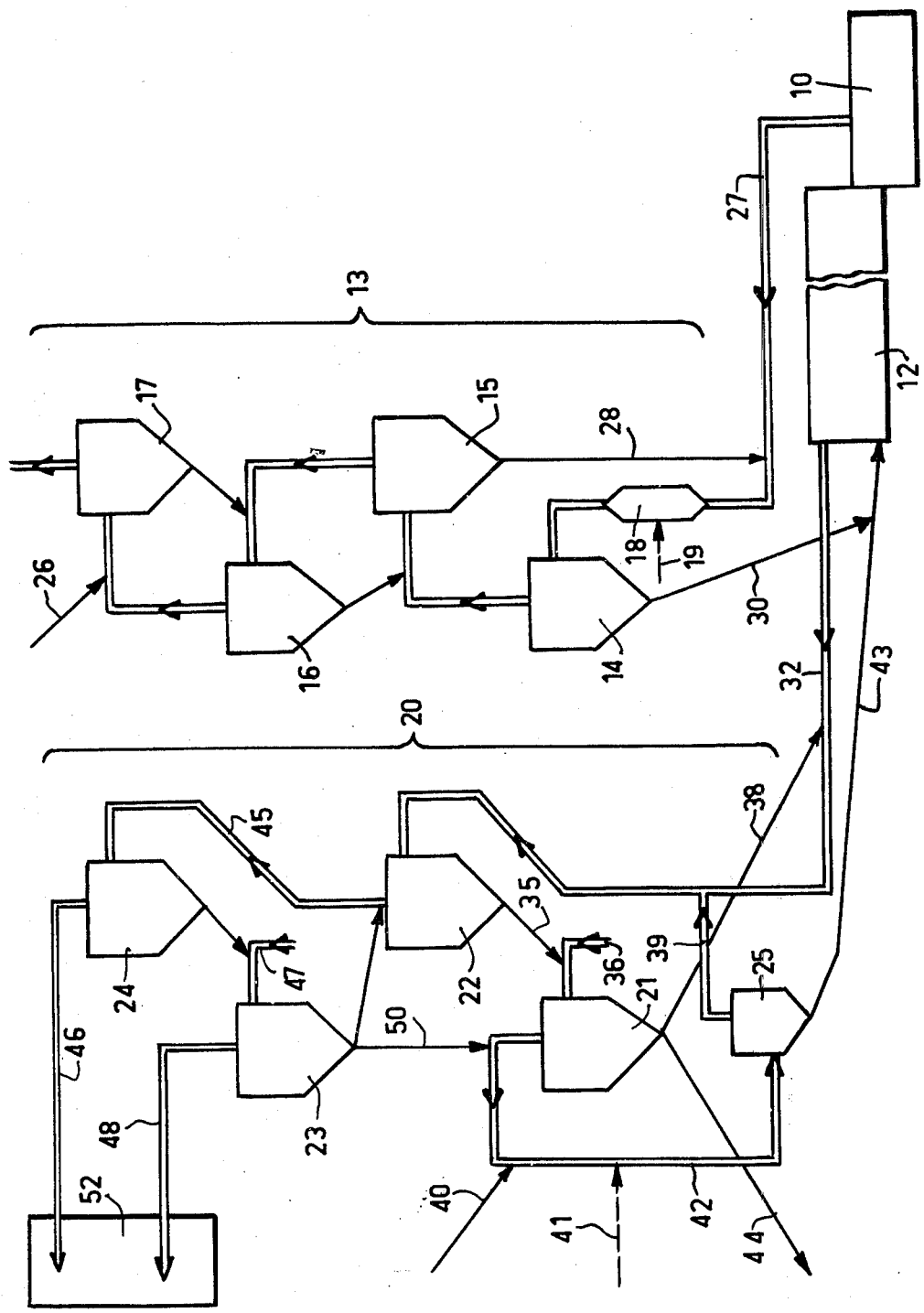

METHOD OF PREPARING CEMENT CLINKER FROM CARBONIFEROUS SHALE

BACKGROUND OF THE INVENTION

The present invention is related to a method of preparing cement clinker from carboniferous shale or from any mineral substance capable of releasing a certain amount of calorific power.

The invention also relates to a cement making installation, for carrying out the above method, said installation being adapted to utilize a starting material which may contain calcareous carboniferous shale issuing from a lignite mine washing installation.

The installation according to the invention is also adapted to operate temporarily with conventional cement making starting materials.

Tests and measurements carried out on such types of substances capable of releasing a certain amount of calorific power have shown that these substances have generally a comparatively low starting combustion temperature, in the order of 200° C., and that they release at a comparatively low temperature tars and distillation products liable to condensate at about 400° C. The quality of these products furthermore is quite inconsistent and they may contain large amounts of sulphur, which is undesirable in that the latter interfere with the normal conditions of preparation of cement clinker.

In the method according to the invention, a raw material is clinkerized which is constituted, in part, by previously calcined carboniferous shale and in part by additive substances comprising clay, limestone and, possibly, other additive substances, which additive substances of the raw material are previously at least partially decarbonated.

The present invention is also related to an installation for carrying out the method of treating the shale.

In fact, the adding of the above-mentioned additive substances is effected depending on the composition of the shale used.

Said installation comprises a rotary clinkerization kiln and a cooler, an exchanger column with staged cyclones which is provided with a fuel injection pre-calcinator, and a shale treating column comprising staged cyclones and a calcination reactor, said exchanger column being fed only with the additive substances of the raw material and effecting the partial decarbonation thereof, while receiving the gases issuing from the cooler, whereas the shale treating column effects the calcination of said shale or of a mixture of shale with at least one additional substance prior to the introduction thereof into the kiln, said shale treating column being fed with the fumes issuing from the kiln and comprising two dust recirculation circuits provided, respectively, between the upper cyclone fed with fumes issuing from the third cyclone from above the cyclone located immediately beneath, which is fed with cool air, and between the lowermost cyclone fed with cool air and the cyclone located immediately above which is fed with the gases issuing from the kiln and the calcination reactor. This arrangement of the cyclones is disclosed in French Patent Application No. 78 01 337 filed in the name of the Applicant.

Whenever the circulating dust loads prove insufficient, it is possible to feed these two circuits with a powderous or granular material the nature of which depends on the chemical composition of the fumes.

Preferably each one of said columns comprises four cyclone stages.

In one embodiment of the invention the gases issuing from the kiln are at least partially by-passed and are quenched by adding cool matter which circulates in the installation and is submitted to a heat exchange with cool air.

During treatment, the shale is injected, possibly with an addition of fuel, into the fumes conduit of the lowermost cyclone of the treating column, which opens into the calcination reactor, the outlet of the latter opening into the kiln, while at least a portion of the dust issuing from the lowermost cyclone is introduced into the fumes conduit of the kiln and partially evacuated. The amount of the fuel possibly introduced together with the shale depends on the calorific power of the latter.

According to one feature of the above-mentioned installation at least a portion of the dust issuing from the second cyclone from above of the shale treating column is injected into the fumes conduit of the lowermost cyclone upstream of the point of injection of the shale.

According to the invention, the hot gases issuing from the zone of treatment of the shale are used for producing energy, especially in the form of steam.

For this purpose the hot gases of the two upper cyclones of the column are introduced, respectively, into the two stages of a two-stage exchanger.

The invention will be described in a more detailed manner herein-below with reference to the appended single figure which is given by way of illustration, but not of limitation.

This figure schematically shows a cement clinker producing installation for carrying out the method according to the invention.

The installation as shown comprises, as described in the downstream-to-upstream direction, a cooler 10 which may be a conventional grid-type cooler, a vertical cooler or any other convenient type of cooler, a rotary clinkerization kiln 12, a conventional four-stage exchanger column 13 comprising four cyclones 14, 15, 16, 17, and a precalcinator 18 provided with fuel injecting means 19; the installation further comprises a special shale treating column 20, also of the four-stage type, including four cyclones 21, 22, 23, 24 and a precalcinator 25.

The exchanger column 13 is fed, at 26, with the additive substances of the shale, and with the gases issuing at 27 from the cooler 10 at a temperature of about 750° C.

In a non-limiting example, said additive substances may be constituted by 33% clay and 67% limestone.

The material is dried and submitted to heat exchange with the gases in cyclones 17, 16 and 15. After issuing at 28 from cyclones 15 the material, which has a temperature of about 720° C., is injected into the air inlet conduit 27 of the cooler. Said material is suspended in the air and passes through the precalcinator 18 in which it is decarbonated up to 90% under the action of the fuel injected at 19. It is cycloned in cyclone 14 and then introduced through 30 into kiln 12 where its decarbonization is completed prior to clinkerization.

Shale treating column 20 is fed with all the gases by-passed through 32 after issuing from kiln 12.

As will be better understood in the light of the following explanations, this column is adapted to meet the main requirements herein-below:

the requirement of calcining the shale at a sufficient temperature (950° C.) with a view to achieving a 100% decarbonization with satisfactory performances of the combustion of this material;

the requirement of trapping the tacky particles stemming from the gases and possibly from the shale burning reactor 25 so as avoid any adherence;

the desire to recover from the gases by-passed from the kiln, and from the gases issuing from reactor 25 a maximum of thermal energy in the form of hot air, without any tacky particles;

the desire of trapping substantially all of the sulphurous compounds contained in the fumes prior to rejecting the latter into the atmosphere;

the possible use of the clean hot air for producing steam or for any other convenient purpose.

The three last requirements herein-above are met due to the provision of two dust circulating stages:

the dust issuing from the kiln at 32 with the gases and stemming from the gases issuing from reactor 25 enter cyclone 22, issue therefrom at 35 and are cooled by suspension in cool air introduced through 36 into cyclone 31, in which said dust is again cycloned;

the dust thus cooled to a temperature of about 500° C. is injected through 38 into the by-passed gases issuing from kiln 12, at a location near the fumes conduit of the kiln.

Due to this injection of the cool dust, the fumes issuing at 32 from kiln 12 and issuing at 39 from reactor 25 are quenched to a temperature of 750° C. at which the alkaline sulphates and other substances that may form concretions are in the solid state.

Furthermore, the tacky particles are thus diluted and the remaining gaseous sulphurous compounds are trapped, whereby the recirculated dust is mainly composed of CaO.

The air reheated to 500° C. in cyclone 21 by this recirculation of the dust is used as combustion air for the shale injected at 40 and for the fuel 41, which are introduced through 42 into reactor 25, the calcined shale being introduced through 43 into kiln 12 after admixture of the additive substances supplied through 30.

After a certain number of cycles between cyclones 21 and 22, a portion of the dust is evacuated through 44. This dust portion, which is highly loaded with lime sulphate on account of the recirculation, is used partially as a cement crushing additive (by reason of its increased lime sulphate content).

With a view to reducing the temperature of the fumes issuing at 45° from cyclone 22 to a value of 600° C., and to trapping the sulphurous compounds which may have escaped from the first recirculating stage, a second dust recirculating stage is provided between cyclones 23 and 24.

The fumes issue at 46 from cyclone 24 at a temperature of about 600° C., while the dust issuing from cyclone 24 reheats the cool air introduced through 47 into cyclone 23; the thus reheated air issues at 48 from cyclone 23 at a temperature of 400° C.

A portion of the dust is evacuated through 50 from cyclone 23 and reinjected through 42 into reactor 25, so as to maintain a constant recirculation rate.

The hot air, at a temperature of 400° C., issuing through 48 from cyclone 23 and the fumes having a temperature of 600° C., and issuing through 46 from cyclone 24, which is preferably a dust removing cyclone, are used in a two-stage exchanger 52 the first stage of which is fed with air at 400° C. and the second stage of which is fed with the fumes at 600° C., in such a manner that, for example, steam is supplied to an electric generating plant.

It will be noted that the above-described installation further offers the advantage of being capable of operating temporarily or during a more or less long period of time without introduction of shale, i.e. in accordance with the operating mode of a conventional installation.

In the first case, i.e. the case of temporary operation without shale, it is sufficient to use only column 13 while deriving directly the kiln fumes flowing through 32 toward precalcinator 18 together with the air issuing from the cooler.

In the second case the fumes conduits of column 20 are modified so as to convert the latter into a column similar to column 13, the dimensions and locations of cyclones 21, 22, 23, 24 having been designed to this end. Column 13 then operates as described herein-above, precalcinator 18 receiving the air issuing from the cooler while reactor 25 of column 20 is put out of circuit, and said column is fed with the fumes issuing from the kiln and supplies solid substances which are partially decarbonated in precalcinator 18 of the other column.

The invention is not limited to the embodiments shown and described herein-above; many modifications and variants may be envisaged by those skilled in the art within the scope of the invention as defined in the appended claims.

What is claimed is:

1. In a method of preparing cement clinker from a mineral raw material capable of releasing calorific energy, such as carboniferous shale, in an installation comprising:

a rotary clinkerization kiln associated to a clinker cooler;

an exchanger column connected to said kiln and including a plurality of superimposed exchanger cyclones and an exchanger precalcinator, and;

a raw material treating column connected to said kiln and including a plurality of superimposed treating cyclones which comprise, from top to bottom, at least one first, one second, one third and one fourth treating cyclone, said treating column further comprising a treating calcinator, the improvement comprising the steps of:

(a) feeding said exchanger column only with additive substances adapted to be used in combination with said raw material for making said clinker, and partially decarbonating said additive substances in said exchanger column prior to introducing said substances into said kiln, and introducing into said exchanger column the gases issuing from said cooler;

(b) feeding the gases issuing from said cooler into said exchanger column through said exchanger precalcinator;

(c) feeding said treating column with said raw material by introducing the same into a flow path leading from the fourth treating cyclone to said treating calcinator;

(d) feeding fumes issuing from said kiln into said third treating cyclone, (e) injecting a portion of the solid matter issuing from said second cyclone into a gas flow path leading from said second cyclone to said first cyclone;

(f) injecting the remaining solid matter issuing from said second cyclone into said flow path connecting said fourth treating cyclone to said treating calcinator, (g) injecting the fumes issuing from said treating calcinator into a flow path through which said fumes issuing from the kiln are fed into said third treating cyclone;

(h) feeding at least a portion of the solid matter issuing from said fourth treating cyclone and the solid matter issuing from said treating calcinator into said kiln.

2. The method of claim 1, further comprising the steps of:

(a) injecting the solid matter issuing from said first treating cyclone into a flow of cool air fed into said second treating cyclone, and (b) injecting the solid matter issuing from said third treating cyclone into a flow of cool air fed into said fourth treating cyclone.

3. The method of any of claims 1 and 2, comprising the further step of injecting fuel into said flow path connecting said fourth treating cyclone to said treating calcinator.

4. The method of any of claims 1 to 3, comprising the further step of feeding the fumes issuing from said first and second treating cyclones into a two-stage heat exchanger.

* * * * *